Aug. 8, 1944.   G. A. TINNERMAN   2,355,486
FASTENING DEVICE
Filed Feb. 15, 1943

INVENTOR.
George A. Tinnerman
BY Bates, Teare & McBean,
Attorneys.

Patented Aug. 8, 1944

2,355,486

UNITED STATES PATENT OFFICE 2,355,486

FASTENING DEVICE

George A. Tinnerman, Cleveland, Ohio, assignor to Tinnerman Products, Inc., Cleveland, Ohio, a corporation of Ohio Application February 15, 1943, Serial No. 475,869

13 Claims. (Cl. 151—14)

This invention is concerned with a fastening device comprising a threaded bolt and a locking plate forming a nut for the bolt, and the purpose of the invention is to provide such members with means to retard the unscrewing of the bolt. A further object is to provide such means in a form which will enable the use of a thread of very high pitch which may thus be screwed into place with comparatively few turns and consequently increased speed of mounting, the retarding elements preventing such bolt being loosened in use by vibration.

A further object of the invention is to so form the coacting retarding elements on the bolt and nut that they coact in a camming manner in turning the bolt in or out so that no special tools or equipment are required to seat or remove the bolt.

In its preferred form, illustrated in the accompanying drawing and hereinafter described in detail, my locking plate comprises a sheet metal member having a bolt opening and a pair of opposed tongues on opposite sides of the opening partially severed from the plate and bent at an acute angle thereto and having their ends spaced apart and recessed and warped to define a helical turn, so that such edges may act as a nut for the bolt, and there are small depressions formed in the outer faces of the tongues adjacent the bolt opening which are adapted to receive successively the humps on the bolt thread.

The construction above outlined provides in effect a ratchet holding of the bolt, in that it introduces additional resistance to the unscrewing of the bolt with each partial turn thereof. This enables a bolt to be used having a thread of very high pitch, and thus adapted to be screwed into place with comparatively few turns and consequently increase speed of mounting, without danger of the bolt being loosened by vibration.

My invention includes not only the fastening device comprising the combination of the plate and the cooperating threaded bolt, but also the plate per se and the bolt per se, as will be clear from the following more detailed description.

Figures 1, 2:
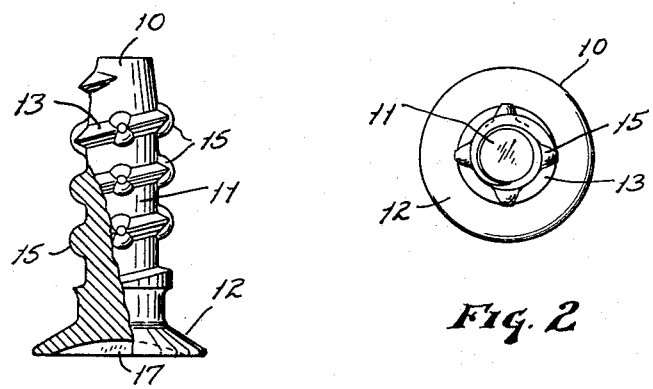
Figure 3:
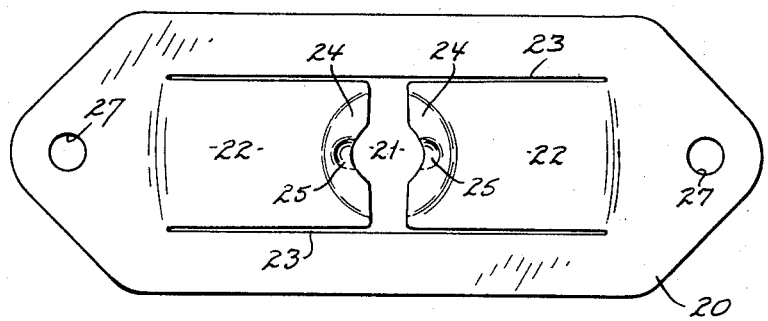
Figure 4:
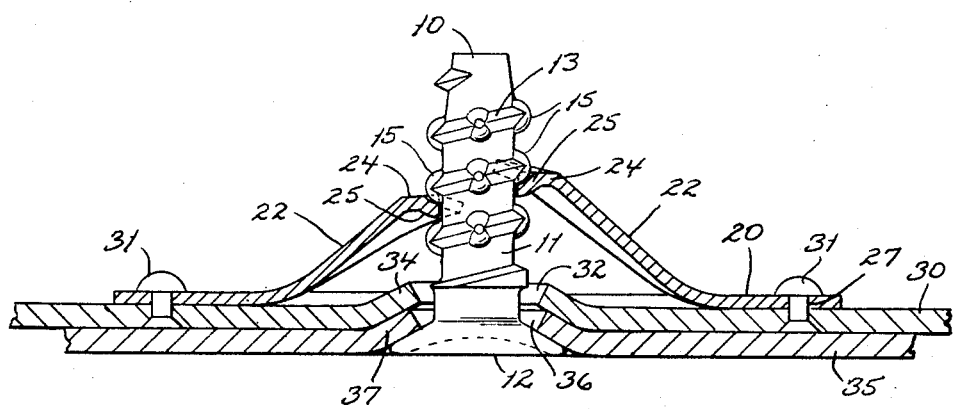

My invention is illustrated in the drawing hereof, in which Fig. 1 is a side elevation partly broken away of the bolt itself; Fig. 2 is a plan of the same; Fig. 3 is a plan of the locking plate itself; Fig. 4 is a sectional elevation of the complete fastening device employing the locking plate and bolt and showing also members clamped in place thereby.

As shown in Figs. 1, 2 and 4, 10 indicates the bolt having a shank 11 and a head 12, the shank being shown as having a body cylindrical for the most part but tapered to a smaller diameter adjacent the extreme end. Formed externally on the body of the shank and integral therewith is the thread 13 shown as V-shaped in cross section and of much higher pitch than the usual standard thread. Periodically about each turn of the thread are formed suitable enlargements, projections, or humps 15. I have shown four of these humps for each turn of the thread, such humps being thus 90° apart.

The head of the bolt may be of any desired form. As shown it is of the countersinking type and has a screw driver slot 17 in its end.

The locking plate comprises a sheet of metal 20 having a central opening 21 for the passage of the bolt and a pair of tongues 22 on opposite sides of the opening. These tongues are produced by making a pair of parallel slits 23 in the plate which extend across the ends of the opening 21 and join it. This leaves the two tongues 22 anchored to the plate at the outer ends of the tongues. These tongues are bent upwardly at an acute angle to the plate and have their ends spaced apart and warped in opposite directions, as indicated in Fig. 4, to provide a helical turn corresponding to the thread groove between the thread ribs 13.

Preferably, the tongues 22 are arched transversely, as indicated in Fig. 4, and where the extreme ends of the tongues are warped to engage the thread groove, they are bent somewhat from the remainder of the tongues and these segmental bent portions designated 24 extend approximately toward each other, though the two segments together make a helical turn. In the upper face of each tongue segment I form a pair of opposed recesses 25 made by indenting the upper surface of these portions, the two recesses being 180° apart.

When the bolt is inserted in the locking plate, the thread groove thereof passes through the space between the ends of the tongues and registers with the helical edge provided by the segmental portions 24. Now with each quarter turn of the bolt one of the projections 15 thereon engages the top of the segment portions of the tongues, cams the same downwardly until two diametrically opposite projections register with the recesses 25, whereupon the tongues spring upwardly toward the projections which are thus seated in the depressions 25. This makes a spring detent tending to restrict the rotation of the bolt.

As shown, the spring detent action takes place with every quarter turn of the bolt, and whenever the bolt is screwed home this action is effective to prevent the bolt jarring loose. This enables the employment of the steep thread shown with the consequent advantage of speed in mounting the bolt.

The bolt may be readily manufactured by rolling, the die grooves which form the thread rib being provided with intersecting recesses which are adapted to form the humps 15 of the character shown. It is the portion of the hump, however, on that side of the thread rib facing the head of the bolt, and leading from the crest of the thread to the body of the shank, which is active in causing the detent action described, as the bolt is turned into place and its helical rib passes through the opening between the tongues and rides on the exposed faces of the tongue segments.

In Fig. 4, which is to be taken as an illustration of any suitable application of the bolt and locking plate of this invention, I have shown the locking plate 20 secured to a supporting plate 30 by rivets 31 which are countersunk in the supporting plate and pass through openings 27 in the locking plate and are upset on the outer face of the locking plate. The supporting plate 30 has an opening 32 for the free passage of the bolt and its thread, this opening being shown as carried by an inwardly diverted frusto-conical portion 34 of the plate. Fig. 4 shows also another plate 35 clamped against the plate 30 by the head of the bolt. As shown this plate 35 has a free bolt opening 36 carried by a frusto-conical portion 37 which seats in the complementarily shaped portion 34 of the plate 30. The countersinking head 12 of the bolt is shown as seating in the conical space provided by the inwardly diverted portion 37 of plate 35 so that the outer face of the bolt is flush with the outer face of the plate 35.

I claim:

1. A fastening device comprising a bolt having a thread and projections on the bolt arranged in a helical course between the crests of adjacent thread turns on the bolt and a locking device adapted to engage the thread groove of the bolt and having spring detent means to coact with successive projections as the bolt is turned into the locking device.

2. A fastening device comprising a bolt having a thread and gradual projections on the thread rib of the bolt and a spring locking device adapted to enter the thread groove of the bolt and having a recess in which successive projections may seat as the bolt is turned into the locking device.

3. The combination of a threaded bolt having spacially arranged projections on the active faces of its thread ribs, and a locking plate having a bolt opening and deformed material of the plate about the opening to enter the thread groove, the outer face of said material being provided with a depression in which successive projections on the bolt may seat as the bolt is turned into place.

4. The combination of a locking plate having a bolt opening and a pair of opposed tongues cut from the plate and bent at an angle thereto and spaced apart and warped at their edges to define a helical turn, a depression made in the outer face of a tongue adjacent the bolt opening, and a bolt screwing through the space between the tongues with the tongues constituting a nut therefor, the bolt having periodically arranged projections adapted successively to seat in said depression.

5. The combination of a locking plate having a bolt opening and a pair of opposed tongues cut from the plate and bent at an angle thereto and spaced apart and warped at their edges to define a helical turn, opposed depressions made in the outer faces of the two tongues adjacent the bolt opening, and a bolt screwing through the space between the tongues with the tongues constituting a nut therefor, the bolt having diametrically arranged projections adapted successively to seat in the depressions on the tongues.

6. A locking plate provided with a bolt opening, a pair of tongues respectively on opposite sides of the opening inclining from the body of the plate and having their ends recessed and warped to define a helical turn, the outer face of each tongue being formed with a depression therein combined with a bolt having a threaded shank and humps formed on the crests of the threads and leading therefrom to the body of the shank, each thread turn having a plurality of humps spaced about the shank, said humps being adapted to seat successively in each depression as the bolt is screwed into place.

7. The combination of a supporting plate having a frausto-conical portion about a bolt opening, a locking plate secured to the supporting plate and having a registering bolt opening and deformed material about the bolt opening to provide a helical turn, a threaded bolt having a head frusto-conical on the inner face to coact with the frusto-conical portion of the supporting plate to clamp another plate between them, said bolt having a shank extending through the bolt opening of the locking plate with the thread coacting with the helical edge of such plate, said shank having projections arranged in a helical course to coact with recesses in the locking plate.

8. A locking plate having a bolt opening, the material of the plate being deformed to provide a helical edge about the bolt opening and a depression in the outer face of the plate adjacent the opening and adapted to be occupied by a projection on a threaded bolt.

9. A locking plate having a bolt opening, a pair of tongues partially severed from the plate at opposite sides of the opening having notched ends bounding the opening, the tongues being anchored to the plate at their distant ends, and depressions in the outer faces of the tongues adjacent the bolt opening.

10. A locking plate having a bolt opening, a pair of tongues partially severed from the plate at opposite sides of the opening and bent at an acute angle to the plate and having segmental regions at the ends of the tongues bent from the bodies of the tongues and oppositely warped to provide an interrupted helical surface and depressions communicating with the bolt opening and diametrically opposite each other in said two segmental regions of the tongues.

11. A bolt having a head and a shank, a projecting thread helically formed on the shank, and projections on each turn of the thread, said projections extending from the crest of the thread to the body of the shank, and being reduced in radial extent gradually in directions parallel with the crest of the thread.

12. A bolt having a thread and periodic gradual projections on the bolt at the thread arranged in pairs diametrically opposite each other and adapted to coact with opposed recesses in a spring locking device which the bolt enters.

13. A bolt having a thread and periodic externally rounded projections helically arranged on the bolt at the thread and each adapted to coact with a spring locking device and force the same in an axial direction until such projection enters a retaining recess in the locking device.

GEORGE A. TINNERMAN.